(12) United States Patent
Rose et al.

(10) Patent No.: US 10,863,311 B2
(45) Date of Patent: Dec. 8, 2020

(54) SELECTING AN OPERATING MODE BASED ON USER PROXIMITY

(71) Applicant: Lenovo (Singapore) Pte. Ltd., Singapore (SG)

(72) Inventors: Amy Leigh Rose, Chapel Hill, NC (US); Jennifer Lee-Baron, Morrisville, NC (US); Nathan J. Peterson, Durham, NC (US); Bryan L. Young, Tualatin, OR (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1163 days.

(21) Appl. No.: 14/502,404

(22) Filed: Sep. 30, 2014

(65) Prior Publication Data

US 2016/0095085 A1 Mar. 31, 2016

(51) Int. Cl.
*H04W 24/00* (2009.01)
*H04M 1/00* (2006.01)
*H04M 3/42* (2006.01)
*H04W 4/029* (2018.01)
*H04W 68/00* (2009.01)

(52) U.S. Cl.
CPC ............ *H04W 4/029* (2018.02); *H04W 68/00* (2013.01)

(58) Field of Classification Search
CPC .. H04L 29/08108; H04W 64/00; H04W 4/02; H04W 48/04; H04M 1/72519

USPC ............ 455/414.1, 456.1–456.6, 550.1
See application file for complete search history.

(56) References Cited

U.S. PATENT DOCUMENTS

| | | | |
|---|---|---|---|
| 2005/0078090 A1* | 4/2005 | Glatzer | G06F 3/0202 345/168 |
| 2008/0214246 A1* | 9/2008 | Li | H04M 1/663 455/567 |
| 2008/0242287 A1* | 10/2008 | Luciani | H04M 1/72577 455/419 |
| 2011/0022666 A1* | 1/2011 | Pinto | G06F 13/4247 709/206 |
| 2014/0156269 A1* | 6/2014 | Lee | G06F 1/3206 704/231 |
| 2014/0273974 A1* | 9/2014 | Varghese | H04M 3/42246 455/412.1 |
| 2014/0289384 A1* | 9/2014 | Kao | H04L 51/12 709/223 |
| 2015/0134801 A1* | 5/2015 | Walley | H04L 41/0893 709/223 |

* cited by examiner

*Primary Examiner* — Matthew W Genack
(74) *Attorney, Agent, or Firm* — Ference & Associates LLC

(57) ABSTRACT

One embodiment provides a method, comprising: detecting, using a processor, a notification at an information handling device; detecting, using a processor, availability of an input associated with an user at the information handling device; and selecting, using a processor, an operating mode of the information handling device, wherein the selected operating mode of the information handling device comprises a mode that modulates a noise. Other aspects are described and claimed.

24 Claims, 3 Drawing Sheets

SELECTING AN OPERATING MODE BASED ON USER PROXIMITY

BACKGROUND

People use information handling devices (e.g., tablets, smart phones, cell phones, tablets, personal data assistants, etc.) to perform many different functions, for example, receive incoming communications, as a calendar assistant, create to-do lists, and the like. In turn, these information handling devices provide some type of notification (e.g., incoming phone call, reminder, alert, incoming text message, etc.) to the user to perform these functions. Generally, with these notifications the device may emit a noise (e.g., vibration, audible sound, etc.). For example, when the user receives a communication (e.g., email, text message, phone call, etc.) the information handling device may ring to inform the user of the incoming communication.

Some users may use their information handling device to remind them of tasks or appointments that they need to complete. A user may set their information handling device to provide a notification concurrent with this reminder. For example, a person may have an appointment with a reminder which provides a notification a certain amount of time before the occurrence of the appointment. Information handling devices may also provide a notification when the device is experiencing an issue. For example, a device may provide a notification when the power level is low or when the device is downloading updates.

BRIEF SUMMARY

In summary, one aspect provides a method, comprising: detecting, using a processor, a notification at an information handling device; detecting, using a processor, availability of an input associated with an user at the information handling device; and selecting, using a processor, an operating mode of the information handling device, wherein the selected operating mode of the information handling device comprises a mode that modulates a noise.

Another aspect provides an information handling device, comprising: a processor; a memory device that stores instructions executable by the processor to: detect a notification at an information handling device; detect availability of an input associated with a user at the information handling device; and select an operating mode of the information handling device, wherein the selected operating mode of the information handling device comprises a mode that modulates a noise.

A further aspect provides a product, comprising: a storage device having code stored therewith, the code being executable by the processor and comprising: code that detects a notification at an information handling device; code that detects availability of an input associated with a user at the information handling device; and code that selects an operating mode of the information handling device, wherein the selected operating mode of the information handling device comprises a mode that modulates a noise.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
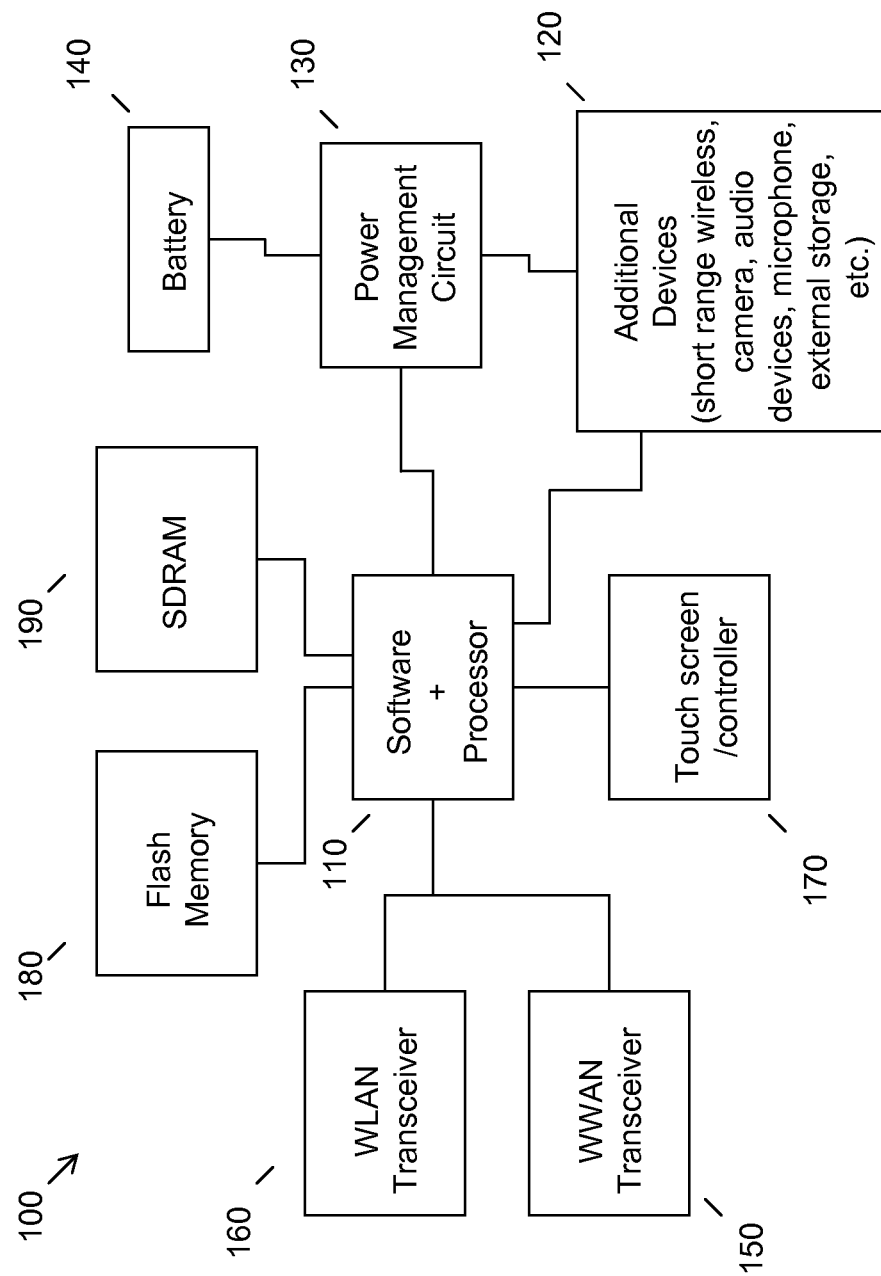
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With the increase of information handling devices (e.g., smart phone, tablet, cell phone, personal data assistant, etc.) that people use to provide them notifications which may produce a noise (e.g., audible sound, vibrations, etc.), it is common that these notifications may interfere with people within proximity to the information handling device. People are increasingly using their information handling devices to not only receive communications (e.g., text messages, phone calls, emails, etc.), but also to perform other functions, for example, as a calendar assistant, to-do list reminder, and the like. For example, a person may have a reminder to take medication or to go to an appointment. In addition, an information handling device may emit notifications when the device provides an alert to a user, for example, when the power level of the device is low, when the device is downloading software, when the device has left a service area, and the like.

When a user has their information handling device in a space where other people are congregating (e.g., workplace, coffee shop, school, etc.), this notification can be annoying to the people around them. Made worse is when the person owning the offending device is not within reach or is inaccessible to the device and it continues to emit this notification. For example, if a coworker leaves their phone on their desk to attend a meeting, when the person receives a call the phone will be left unanswered and continue to ring, much to the annoyance of other coworkers. Additionally, a person may have their phone set to remind them of a missed communication. This means that the information handling device may emit a new notification within a certain amount of time after the receipt of the communication. When a user sets a calendar notification, the information handling device may continue to emit a notification until the notification is acknowledged.

One method of reducing the amount of distraction to other people is to set the information handling device to vibrate or silent. The problem with this is that is requires the user of the information handling device to remember to do this before leaving their device. A person may not remember to do this and the information handling device will continue to distract those people who may be within earshot. Additionally, even if the information handling device is set to vibrate, those within earshot may be able to hear the vibrating of the device.

Accordingly, an embodiment provides a method of selecting an operating mode of a device where the operating mode modulates a sound, upon detecting an availability of an input associated with a user after a notification has been detected on a device. The operating mode may include a silent mode, vibrate mode, full sound mode, or the like. This may reduce the amount of annoyance and distraction to people within the vicinity of the information handling device.

An example embodiment, may detect a notification (e.g., incoming communication, information handling device alert, reminder, etc.) at an information handling device. With this notification the information handling device may emit a noise, for example, the device may vibrate, ring, beep, and the like. Upon detecting this notification, an embodiment may detect an availability of an input associated with a user (e.g., a user touching the device, a user acknowledging the notification, a user ignoring the notification, a user within proximity to the device, a user absence, etc.). In an embodiment the availability of an input may be for a predetermined length of time. Alternatively or additionally, the availability of an input may be for a predetermined number of notifications. Based upon the availability of an input associated with a user at the information handling device, an embodiment may select an operating mode of the information handling device (e.g., full sound, silent, vibrate, etc.).

Upon receiving user input an example embodiment may reestablish the previous operating mode of the information handling device. Alternatively or additionally, the previous operating mode of the device may be reestablished after a predetermined length of time. In one example embodiment, location data associated with the information handling device may be used to determine the location of the device. An embodiment may use this information to determine whether the current operating mode should be changed. For example, a user may not want the operating mode of the device disabled while the device is located within the user's home.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
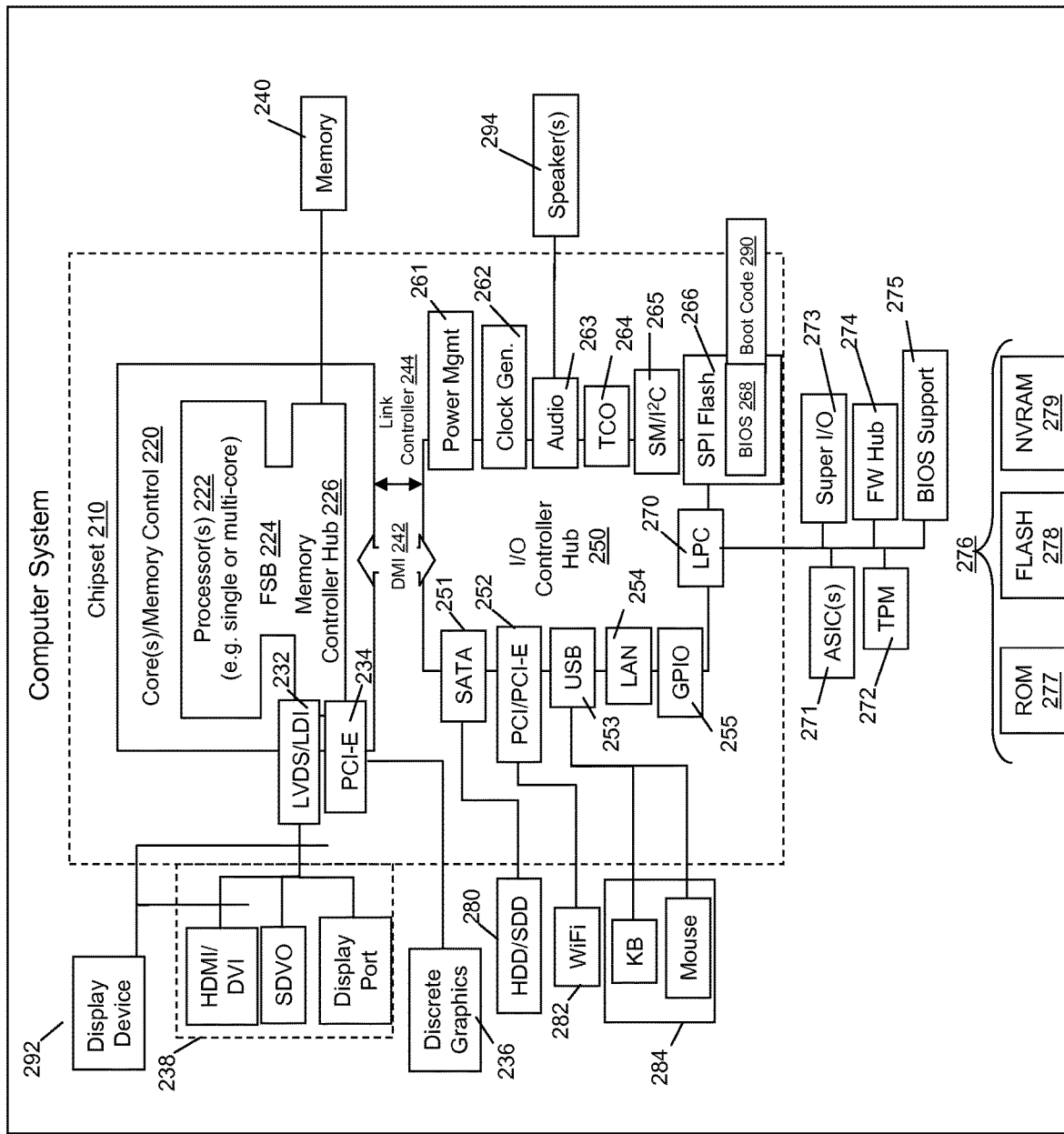
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292. A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, cell phones, personal data assistants, personal computer devices generally, and/or other electronic devices which users may use to receive notifications in connection with communications, reminders, device errors, and the like. For example, the circuitry outlined in FIG. 1 may be implemented in a tablet or smart phone embodiment, whereas the circuitry outlined in FIG. 2 may be implemented in a personal computer embodiment.

Figure 3:
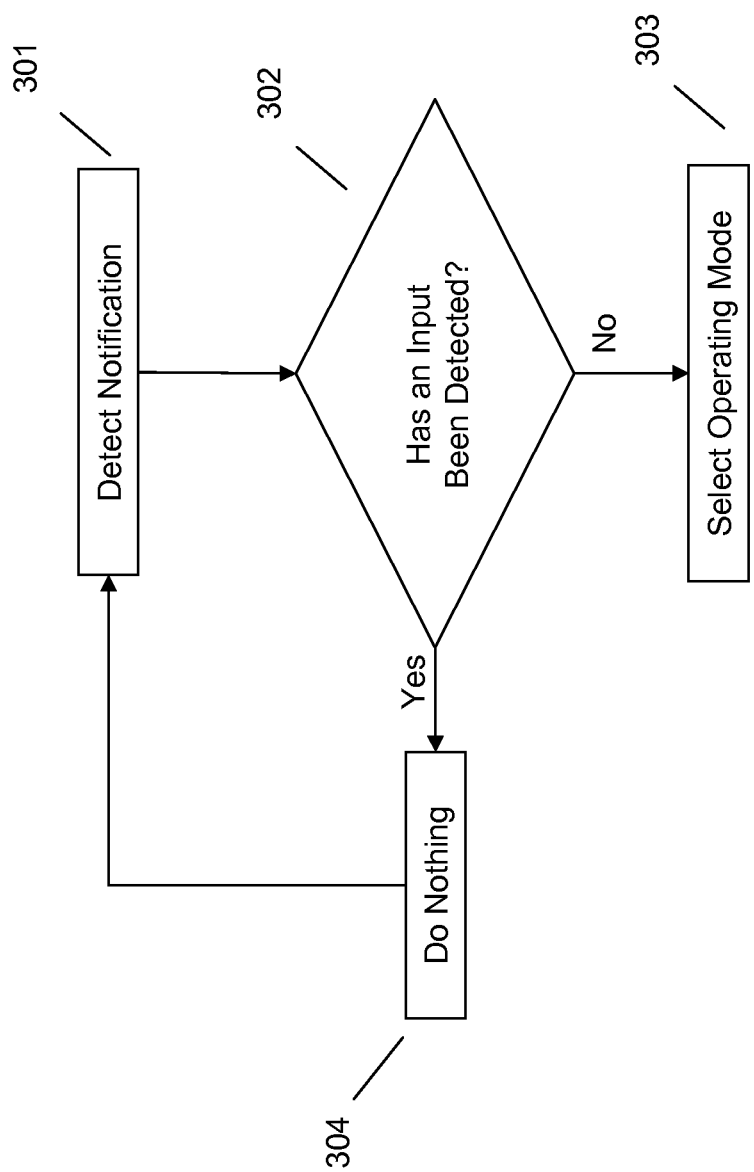
FIG. 3 illustrates an example method of selecting an operating mode based on user proximity.

Referring now to FIG. 3, an embodiment may detect a notification at an information handling device at 301. This notification may be, for example, an incoming communication (e.g., text message, phone call, email, social media post, etc.), a reminder (e.g., in response to a calendar appointment, to-do list, location reminder, etc.), an information handling device alert (e.g., low power level, software download, device error, loss of reception, etc.), and the like. The information handling device may be in an operating mode in which, along with the notification, the device also produces a noise (e.g., vibration, beep, ring, sound, etc.). Alternatively, the information handling device may be in an operating mode in which a noise is not produced (e.g., silent, mute, calls silenced, etc.).

At 302, an embodiment may detect an availability of an input associated with a user (e.g., the user touching the device, acknowledgement of the notification, silencing the device, etc.) at the information handling device. The availability of an input associated with a user may, for example, include a presence of user input, an absence of user input, a presence of the user, an absence of a user, a presence of a personal area network signal, and the like. For example, a user may have a watch on their person which may be wirelessly attached to the information handling device. An embodiment may detect the presence of this device as an availability of an input associated with a user.

In one embodiment, the availability of an input associated with a user may include an absence of movement of the device. This absence of movement may be detected using, for example, accelerometers, image capture devices, gyroscopes, and the like. For example, if a presence of movement is detected (e.g., the user is walking with the device, the user is moving the device on the desk, etc.) an embodiment may allow the device to ring.

The availability of an input associated with a user may be measured using an amount of time. For example, an embodiment may detect an absence of user input for a predetermined amount of time. For example, the availability of an input associated with a user may be an absence of user input for three minutes. Alternatively or additionally, an embodiment may detect an availability of an input associated with a user using a number of notifications. For example, the availability of an input associated with a user may be the absence of user input for a predetermined number of notifications. For example, an absence of user input may be determined if there is no user input before the device has rung five times. The availability of an input associated with a user may be user configurable. For example, a user may want the device to make a determination of an availability of an input based upon a touch input. As an alternatively example, a user may want the determination to be based upon whether the user is within proximity to the device.

Additionally or alternatively, a user may configure the device to make a determination of an availability of an input based upon a length of time or particular number of notifications. For example, the user may configure the length of time or number of notifications that may occur before the device determines that an absence of user input exists. In addition, the user may, in one embodiment, configure the determination to be different for different locations. For example, if the device is at work, the selecting of the operating mode may occur within a short time frame than if the device is located at home. The availability of an input associated with a user may also be determined in other ways. For example, an availability of user input may be determined using a presence of a communication protocol (e.g., short range communication protocol, Bluetooth, wireless network, etc.), a presence of a user (e.g., an image capture device detecting the user is within range, an audio capture device, etc.), an absence of user input (e.g., the user has not touched the device, the user has not provided an input, etc.) and the like.

If an embodiment detects an availability of an input associated with a user which matches the previous availability of an input associated with a user, an embodiment may do nothing at 304 and wait until the next notification is detected at 301. For example, if the device determines that a user is present and upon receiving a notification at 301 still detects that a user is present at 302, an embodiment may take no further action at 304. If, however, the availability of an input associated with a user does not match the previous availability of an input associated with a user at 302, an embodiment may select an operating mode of the information handling device at 303. The selected operating mode may comprise a mode that modulates a noise. This noise may be haptic (e.g., vibration) or auditory (e.g., ring, beep, sound, etc.). For example, an embodiment may switch the device to silent if it is currently in full sound mode, or it may switch the device to full sound mode if it is in vibrate mode. As an example, an embodiment may silence the device in the case of an absence being detected. As an alternative example, an embodiment may produce a sound in the case of a presence being detected.

The selecting of the operating mode may include an operating mode including silence, vibrate, full sound, and the like. For example, in the case of silencing the device, the silencing may be completed using the mute mode of the information handling device, which may be akin to a user silencing the entire device (e.g., putting the device in no sound mode). Alternatively or additionally, an embodiment may silence just the notification, which may be akin to a user pushing the quiet or silence button when a notification is received. Other methods of silencing the device may be possible. For example, the device may be silenced for certain notifications, such as the device will still beep for an alert but will remain silent during an incoming communication. In one embodiment, the disabling of the operating mode may comprise switching the device to vibrate mode, if the device is in a full sound mode. These examples may be applicable to the other modes including full sound mode and vibrate mode.

In one embodiment, user input (e.g., the user touching the device, the user moving the device, the user inputting information on the device, etc.) may be received at the information handling device after the operating mode has been selected. Upon receiving this user input, an embodiment may reestablish the previous operating mode of the information handling device. For example, if the operating mode that was disabled was a full sound mode, upon receiving user input, the full sound mode may be reestablished. Alternatively or additionally, an embodiment may reestablish the previous operating mode of the information handling device after a preconfigured amount of time has passed since the selecting of the operating mode. For example, if an hour has passed since the operating mode was selected, an embodiment may reestablish the previous operating mode.

One embodiment may detect location data associated with the information handling device. For example, an embodiment may use GPS, wireless, Bluetooth, or other such data to determine where the information handling device is currently located. Based upon this location data, an embodiment may reestablish the previous operating mode of the information handling device. For example, an embodiment may determine that the device is located at the user's home based upon the WiFi network. An embodiment may then reestablish the previous operating mode based upon the fact that the device is located at the user's home. An embodiment may compare the location data to a rule set. For example, the user may create a rule set or the device may be preprogrammed with a rule set. This rule set may comprise locations in which the previous operating mode of the device should be reestablished. For example, the user may create a rule set which includes "home", "child's home", and "coffee shop" as locations in which the previous operating mode should be reestablished.

Additionally or alternatively, an embodiment may include other information (e.g., phone numbers, email addresses, a group of people, etc.) which reestablishes the previous operating mode of the device. For example, a user may desire that a particular phone number is never silenced. As another example, a user may set a specific group of people (e.g., family, friends, coworkers, etc.) to never ring. Some rule sets may be used in combination. For example, a user may set that coworkers may never be silenced while the information handling device is located at work. Other possible rule sets may be contemplated.

Accordingly, as illustrated by the example embodiments and figures, an embodiment provides a method of selecting an operating mode of an information handling device that modulates a noise. This noise may be either haptic or audible. Upon the detection of a notification, an embodiment may detect an availability of an input associated with a user. This availability of an input associated with a user may be configurable, for example, the availability may be determined using a length of time or a number of notifications. Upon detecting this availability of an input associated with a user, an embodiment may selecting the operating mode of the device. Thus, when a user cannot access the information handling device or has forgotten to put the device in a quiet mode, the distraction and annoyance caused to those people within the vicinity of the device may be reduced.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using a processor, a notification at an information handling device;
   detecting, using a processor, availability of an input associated with a user at the information handling device, wherein the detecting an availability of an input comprises detecting an interaction of the user with the information handling device; and
   selecting, using a processor, an operating mode of the information handling device, wherein the selected operating mode of the information handling device comprises a mode that modulates a noise and wherein the selecting an operating mode is based upon a user defined rule set associated with the detected availability of an input and a type of the notification.

2. The method of claim 1, wherein the selecting an operating mode comprises an operating mode selected from the group consisting of: silence, vibrate, and full sound.

3. The method of claim 1, wherein the availability of an input associated with a user comprises an absence of user input for a predetermined amount of time.

4. The method of claim 1, wherein the availability of an input associated with a user comprises an absence of user input for a predetermined number of notifications.

5. The method of claim 1, further comprising:
   receiving user input at the information handling device; and
   reestablishing a previous operating mode of the information handling device.

6. The method of claim 1, further comprising:
   determining a preconfigured amount of time has passed since the selecting of the operating mode of the information handling device; and
   reestablishing a previous operating mode of the information handling device.

7. The method of claim 1, further comprising:
   detecting location data associated with the information handling device; and
   reestablishing a previous operating mode of the information handling device based upon the location data associated with the information handling device.

8. The method of claim 7, further comprising comparing the location data associated with the information handling device to a rule set, wherein the rule set comprises locations in which the previous operating mode should be reestablished.

9. The method of claim 1, wherein the notification is in response to a trigger event and the trigger event comprises an event selected from the group consisting of: an incoming communication, a reminder, and an information handling device alert.

10. The method of claim 1, wherein the noise produced during the operating mode of the information handling device comprises a noise selected from the group consisting of: auditory and haptic.

11. The method of claim 1, wherein the availability of an input associated with a user is selected from the group consisting of: presence of user input, absence of user input, presence of user, absence of user, and presence of a personal area network signal associated with a user.

12. The method of claim 1, wherein modulates is selected from the group consisting of: silencing in the case of an absence being detected and sounding in the case of a presence being detected.

13. An information handling device, comprising:
   a processor;
   a memory device that stores instructions executable by the processor to:
   detect a notification at an information handling device;
   detect availability of an input associated with a user at the information handling device, wherein to detect an availability of an input comprises detecting an interaction of the user with the information handling device; and
   select an operating mode of the information handling device, wherein the selected operating mode of the information handling device comprises a mode that modulates a noise and wherein the selecting an operating mode is based upon a user defined rule set associated with the detected availability of an input and a type of the notification.

14. The information handling device of claim 13, wherein to select an operating mode comprises an operating mode selected from the group consisting of: silence, vibrate, and full sound.

15. The information handling device of claim 13, wherein the availability of an input associated with a user comprises an absence of user input for a predetermined amount of time.

16. The information handling device of claim 13, wherein the availability of an input associated with a user comprises an absence of user input for a predetermined number of notifications.

17. The information handling device of claim 13, wherein the instructions are further executable to:
   receive user input at the information handling device; and
   reestablish a previous operating mode of the information handling device.

18. The information handling device of claim 13, wherein the instructions are further executable to:
   determine a preconfigured amount of time has passed since the selecting of the operating mode of the information handling device; and
   reestablish a previous operating mode of the information handling device.

19. The information handling device of claim 13, wherein the instructions are further executable to:
   detect location data associated with the information handling device; and
   reestablish a previous operating mode of the information handling device based upon the location data associated with the information handling device.

20. The information handling device of claim 19, wherein the instructions are further executable to compare the location data associated with the information handling device to a rule set, wherein the rule set comprises locations in which the previous operating mode should be reestablished.

21. The information handling device of claim 13, wherein the notification is in response to a trigger event and the trigger event comprises an event selected from the group consisting of: an incoming communication, a reminder, and an information handling device alert.

22. The information handling device of claim 13, wherein the availability of an input associated with a user is selected from the group consisting of: presence of user input, absence of user input, presence of user, absence of user, and presence of a personal area network signal associated with a user.

23. The information handling device of claim 13, wherein modulates is selected from the group consisting of: silencing in the case of an absence being detected and sounding in the case of a presence being detected.

24. A product, comprising:
a storage device having code stored therewith, the code being executable by a processor and comprising:
code that detects a notification at an information handling device;
code that detects availability of an input associated with a user at the information handling device, wherein the code that detects an availability of an input comprises code that detects an interaction of the user with the information handling device; and
code that selects an operating mode of the information handling device, wherein the selected operating mode of the information handling device comprises a mode that modulates a noise and wherein the selecting an operating mode is based upon a user defined rule set associated with the detected availability of an input and a type of the notification.

* * * * *